US012145387B2

(12) United States Patent
Yoneyama et al.

(10) Patent No.: US 12,145,387 B2
(45) Date of Patent: Nov. 19, 2024

(54) THERMAL TRANSFER IMAGE-RECEIVING SHEET, METHOD FOR PRODUCING PRINTED MATERIAL, AND PRINTED MATERIAL

(71) Applicant: Dai Nippon Printing Co., Ltd., Tokyo (JP)

(72) Inventors: Yasushi Yoneyama, Tokyo (JP); Ikumi Washie, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 36 days.

(21) Appl. No.: 17/755,049

(22) PCT Filed: Nov. 20, 2020

(86) PCT No.: PCT/JP2020/043378
§ 371 (c)(1),
(2) Date: Apr. 20, 2022

(87) PCT Pub. No.: WO2021/100850
PCT Pub. Date: May 27, 2021

(65) Prior Publication Data
US 2022/0371351 A1 Nov. 24, 2022

(30) Foreign Application Priority Data
Nov. 20, 2019 (JP) ................................. 2019-210053
Aug. 24, 2020 (JP) ................................. 2020-141203

(51) Int. Cl.
*B41M 5/382* (2006.01)
*B41M 5/42* (2006.01)
*B41M 5/52* (2006.01)

(52) U.S. Cl.
CPC .............. *B41M 5/382* (2013.01); *B41M 5/42* (2013.01); *B41M 5/52* (2013.01);
(Continued)

(58) Field of Classification Search
CPC .......... B41M 5/382; B41M 5/42; B41M 5/52; B41M 2205/02; B41M 2205/06; B41M 2205/32; B41M 2205/38
See application file for complete search history.

(56) References Cited

U.S. PATENT DOCUMENTS 6,186,067 B1 * 2/2001 Rorke .................. B41C 1/1033
101/457
6,372,689 B1 4/2002 Kuga et al.
(Continued)

FOREIGN PATENT DOCUMENTS

JP 2001-039043 A 2/2001
JP 2004-345289 A 12/2004
(Continued)

OTHER PUBLICATIONS

International Search Report and Written Opinion (Application No. PCT/JP2020/043378) dated Dec. 28, 2020 (with English translation).
(Continued)

*Primary Examiner* — Yaovi M Ameh
(74) *Attorney, Agent, or Firm* — BURR PATENT LAW, PLLC

(57) ABSTRACT

A thermal transfer image-receiving sheet of the present disclosure is characterized by including a substrate, a heat-sensitive recess-forming layer, and a receiving layer, in which the heat-sensitive recess-forming layer has a thickness of 40 μm or more, and a recess to be formed by application of an energy of 0.27 mJ/dot from a side of the receiving layer through a film including a 1-μm-thick back layer disposed on a poly(ethylene terephthalate) film having a thickness of 4 μm has a depth of 5 μm or more.

10 Claims, 6 Drawing Sheets

(52) U.S. Cl.
CPC ..... *B41M 2205/02* (2013.01); *B41M 2205/06* (2013.01); *B41M 2205/32* (2013.01); *B41M 2205/38* (2013.01)

(56) References Cited

U.S. PATENT DOCUMENTS

| | | | | |
|---|---|---|---|---|
| 7,470,649 | B2 * | 12/2008 | Nakane | B41M 5/426<br>428/32.5 |
| 9,290,007 | B2 | 3/2016 | Yamamuro et al. | |
| 2007/0252887 | A1 | 11/2007 | Mizuhara et al. | |
| 2010/0147166 | A1 | 6/2010 | Hirota et al. | |

FOREIGN PATENT DOCUMENTS

| | | | | | |
|---|---|---|---|---|---|
| JP | 2006-027264 | A | | 2/2006 | |
| JP | 2006-159812 | A | | 6/2006 | |
| JP | 2007-098586 | A | | 4/2007 | |
| JP | 2007-296745 | A | | 11/2007 | |
| JP | 2009061733 | A | * | 3/2009 | B41M 5/382 |
| JP | 2009-143183 | A | | 7/2009 | |
| JP | 2009-233974 | A | | 10/2009 | |
| JP | 2009-285831 | A | | 12/2009 | |
| JP | 2011051208 | A | * | 3/2011 | B41M 5/382 |
| JP | 2014-159100 | A | | 9/2014 | |

OTHER PUBLICATIONS

Japanese Office Action (Application No. 2021-119989) dated Nov. 1, 2022 (with English translation).

English translation of the International Preliminary Report on Patentability (Chapter I) dated Jun. 2, 2022 (Application No. PCT/JP2020/043378).

Extended European Search Report dated Nov. 7, 2023 (Application No. 20890643.8).

* cited by examiner

THERMAL TRANSFER IMAGE-RECEIVING SHEET, METHOD FOR PRODUCING PRINTED MATERIAL, AND PRINTED MATERIAL

TECHNICAL FIELD

The present disclosure relates to a thermal transfer image-receiving sheet, a method for producing a printed material, and a printed material.

BACKGROUND ART

Hitherto, various methods for forming images have been known. Among those, a sublimation type thermal transfer method enables density gradation to be freely adjusted, has excellent reproducibility of neutral colors and of gradation, and makes it possible to form high-quality images comparable to silver halide photographs.

In this sublimation type thermal transfer method, a thermal transfer sheet including a sublimation transfer-type coloring layer containing a sublimation dye and a thermal transfer image-receiving sheet including a receiving layer are superposed on each other, and then the thermal transfer sheet is heated by a thermal head included in a printer to transfer the sublimation dye in the sublimation transfer-type coloring layer to the receiving layer to form an image, thereby providing a printed material (for example, see Patent Literature 1).

In addition, a protective layer is transferred from the thermal transfer sheet to the receiving layer, on which the image has been formed, of the printed material produced in this way, thereby improving the durability and other properties of the printed material.

CITATION LIST

Patent Literature

PTL 1: Japanese Unexamined Patent Application Publication No. 2001-39043

SUMMARY OF INVENTION

Technical Problem

In recent years, printed materials obtained by the above-described method have been required to have a wide variety of design properties. For example, printed materials with high three-dimensional effects have been required for the purpose of expressing rarity and so forth of printed materials.

It is an object of the present disclosure to provide, as a solution, a thermal transfer image-receiving sheet capable of forming a recess in a desired region and producing a printed material having a high three-dimensional effect.

It is an object of the present disclosure to provide, as a solution, a method for producing a printed material having a high three-dimensional effect by using the above thermal transfer image-receiving sheet.

It is an object of the present disclosure to provide, as a solution, a printed material having a high three-dimensional effect.

Solution to Problem

A thermal transfer image-receiving sheet according to a first embodiment of the present disclosure is characterized by including a substrate, a heat-sensitive recess-forming layer, and a receiving layer, in which the heat-sensitive recess-forming layer has a thickness of 40 μm or more, and a recess to be formed by application of an energy of 0.27 mJ/dot from the side of the receiving layer through a film including a 1-μm-thick back layer disposed on a poly (ethylene terephthalate) film having a thickness of 4 μm has a depth of 5 μm or more.

A thermal transfer image-receiving sheet according to a second embodiment of the present disclosure is characterized by including a substrate, a heat-sensitive recess-forming layer, and a receiving layer,

- in which the heat-sensitive recess-forming layer has a thickness of 40 μm or more,
- the heat-sensitive recess-forming layer includes two or more pore-containing layers, and
- a first heat-sensitive recess-forming layer is included in the heat-sensitive recess-forming layer, is closest to the receiving layer, and is a porous film.

A method for producing a printed material according to the present disclosure is characterized by including:

- a step of providing the above-described thermal transfer image-receiving sheet;
- a step of forming an image on the receiving layer included in the thermal transfer image-receiving sheet; and
- a step of forming a recess at the thermal transfer image-receiving sheet.

A printed material, according to the present disclosure, produced by using the above-described thermal transfer image-receiving sheet, is characterized by including:

- the substrate, the heat-sensitive recess-forming layer, and the receiving layer on which an image is formed,
- in which a recess having a depth of 5 μm or more is formed.

Advantageous Effects of Invention

According to the present disclosure, it is possible to provide a thermal transfer image-receiving sheet capable of forming a recess in a desired region and producing a printed material having a high three-dimensional effect.

Moreover, it is possible to provide a method for producing a printed material having a high three-dimensional effect.

Furthermore, it is possible to provide a printed material having a high three-dimensional effect.

DESCRIPTION OF EMBODIMENTS

Figure 1:
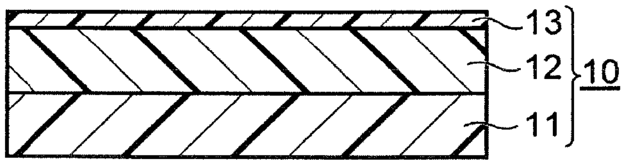
FIG. 1 is a schematic cross-sectional view illustrating a thermal transfer image-receiving sheet according to an embodiment of the present disclosure.

Embodiments of the present disclosure will be described below with reference to drawings and the like. The present disclosure can be implemented in many different forms and is not to be construed as limited to the description of the embodiments illustrated below.

The drawings may be schematically represented in terms of, for example, width, thickness, angles, and shape of each portion, compared to the actual form in order to make the description clearer. However, the drawings are merely examples and do not limit the interpretation of the present disclosure. In this specification and in each of the drawings, elements similar to those described previously with respect to the drawings already illustrated may be designated using the same reference numerals, and detailed descriptions may be omitted as appropriate. For convenience of explanation, the term such as upward or downward is used to explain, but the upward and downward directions may be reversed. The same applies to the right and left directions.

Thermal Transfer Image-Receiving Sheet

A thermal transfer image-receiving sheet according to each of first and second embodiments of the present disclosure includes:

- a substrate, a heat-sensitive recess-forming layer, and a receiving layer,
- in which the heat-sensitive recess-forming layer has a thickness of 40 μm or more.

In the thermal transfer image-receiving sheet according to the first embodiment, a recess to be formed by application of an energy of 0.27 mJ/dot from the receiving layer side through a film including a 1-μm-thick back layer disposed on a poly(ethylene terephthalate) film having a thickness of 4 μm has a depth of 5 μm or more.

In the thermal transfer image-receiving sheet according to the second embodiment, the heat-sensitive recess-forming layer includes two or more pore-containing layers, and a first heat-sensitive recess-forming layer is included in the heat-sensitive recess-forming layer, is closest to the receiving layer, and is a porous film.

Hereinafter, the thermal transfer image-receiving sheets of the first and second embodiments of the present disclosure are also referred to as a "first thermal transfer image-receiving sheet" and a "second thermal transfer image-receiving sheet", respectively. The first and second thermal transfer image-receiving sheets are also referred to simply as "thermal transfer image-receiving sheets".

As illustrated in FIG. 1, a thermal transfer image-receiving sheet 10 of the present disclosure includes a substrate 11, a heat-sensitive recess-forming layer 12, and a receiving layer 13.

Figure 2:
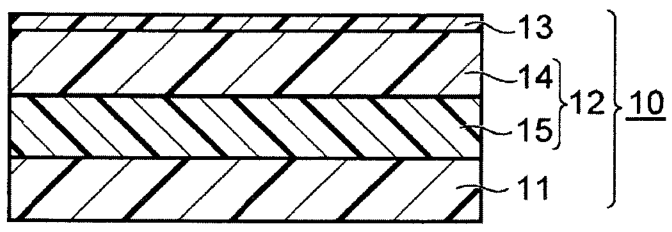
FIG. 2 is a schematic cross-sectional view illustrating a thermal transfer image-receiving sheet according to an embodiment of the present disclosure.

In an embodiment, as illustrated in FIG. 2, the heat-sensitive recess-forming layer 12 may have a multilayer structure in the first thermal transfer image-receiving sheet and has a multilayer structure in the second thermal transfer image-receiving sheet. In the present disclosure, an nth heat-sensitive recess-forming layer in order from the receiving layer side is referred to as an "nth heat-sensitive recess-forming layer", where n is an integer of 1 or more. For example, in FIG. 2, the heat-sensitive recess-forming layer 12 includes a first heat-sensitive recess-forming layer 14 and a second heat-sensitive recess-forming layer 15 in order from the receiving layer 13 side.

The thermal transfer image-receiving sheet 10 according to an embodiment of the present disclosure includes an optional layer, such as an adhesive layer (not illustrated in the figure), between freely-selected layers, for example, between the substrate 11 and the heat-sensitive recess-forming layer 12 or between layers included in the heat-sensitive recess-forming layer 12 having a multilayer structure.

In an embodiment, the thermal transfer image-receiving sheet 10 of the present disclosure has a primer layer (not illustrated in the figure) between the heat-sensitive recess-forming layer 12 and the receiving layer 13.

Figure 3:
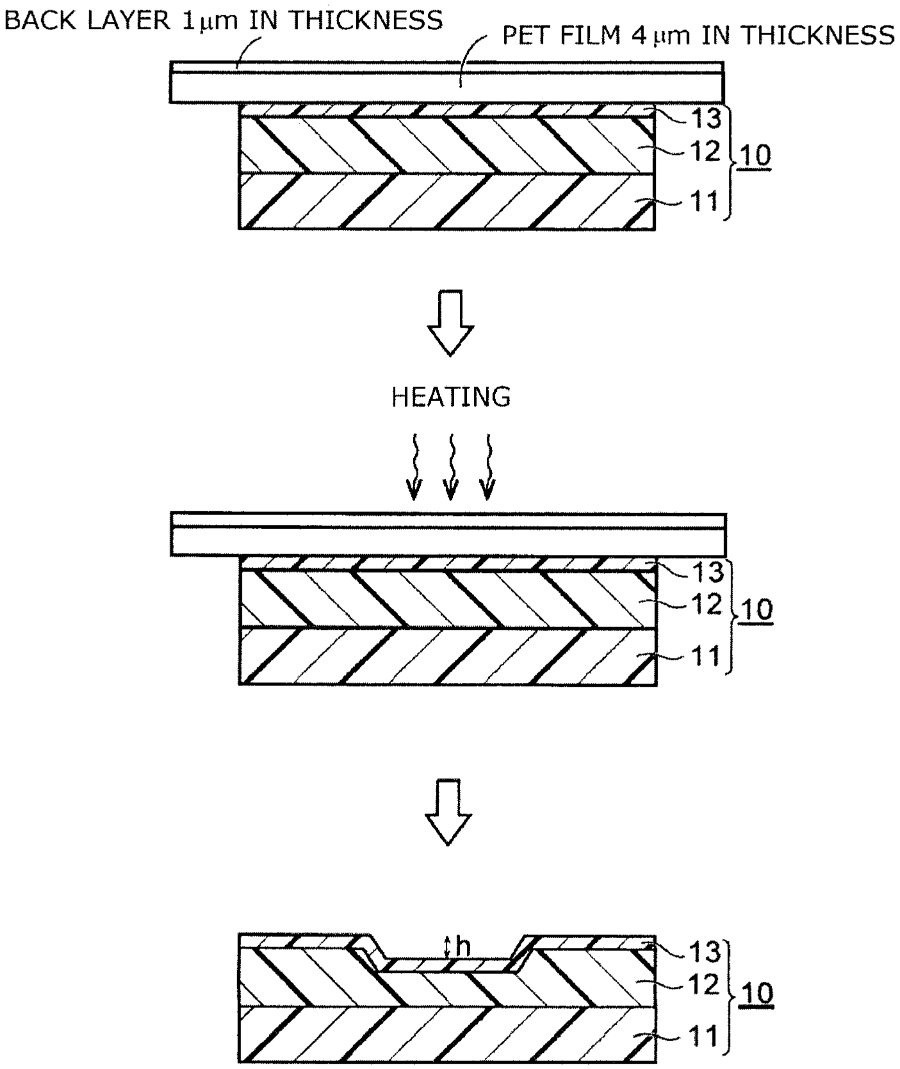
FIG. 3 is a schematic cross-sectional view illustrating steps of forming a recess at a thermal transfer image-receiving sheet of the present disclosure.

The first thermal transfer image-receiving sheet is characterized in that a recess to be formed by heating a region of the thermal transfer image-receiving sheet by application of an energy of 0.27 mJ/dot with, for example, a thermal head from the receiving layer side through a film including a 1-μm-thick back layer disposed on a poly(ethylene terephthalate) (PET) film having a thickness of 4 μm has a depth h of 5 μm or more (see FIG. 3). The recess formed under the same conditions preferably has a depth h of 8 μm or more, more preferably 10 μm or more, even more preferably 12 μm or more, and particularly preferably 15 μm or more. Details of the back layer having a thickness of 1 μm are described in Examples.

As the PET film, Lumirror (registered trademark) #5A-F53, available from Toray Industries, Inc., is preferably used. The depth of the formed recess is measured from the profile obtained using a shape analysis laser microscope (available from Keyence Corporation, VK-X150/160, 10× objective lens).

When the thermal transfer image-receiving sheet includes the primer layer, the primer layer typically has high brightness. Thus, the depth can be satisfactorily measured at the interface between the primer layer and the receiving layer.

The applied energy (mJ/dot) refers to applied energy calculated from equation (1). The applied electric power [W] in equation (1) can be calculated from equation (2).

$$\text{Applied energy}(mJ/dot)=W\times L\cdot S\times P\cdot D\times\text{gradation value} \quad (1)$$

In equation (1), W represents an applied power, L·S represents one line period (msec/line), and P·D represents a pulse duty.

$$\text{Applied power}(W/dot)=V^2/R \quad (2)$$

In equation (2), V represents an applied voltage, and R represents the resistance value of a heating means.

In the present disclosure, by adjusting a recess formation region in the thermal transfer image-receiving sheet, it is possible to impart a three-dimensional effect to a printed material to improve the design thereof. For example, by forming recesses in regions other than image regions, such as shapes or patterns of, e.g., characters or figures, on the receiving layer, it is possible to provide a three-dimensional effect to these images.

For the first thermal transfer image-receiving sheet, a recess to be formed by heating a region of the thermal transfer image-receiving sheet by application of an energy of 0.16 mJ/dot with, for example, a thermal head from the receiving layer side through a film including a 1-μm-thick back layer disposed on a PET film having a thickness of 4 μm preferably has a depth of less than 4 μm, more preferably less than 2 μm.

This makes it possible to suppress the formation of unintended recesses during image formation and transfer of a protective layer, that is, the formation of recesses under non-high temperature conditions. Hereinafter, these are collectively referred to simply as "embossing-suppressing properties during printing".

Each layer included in the thermal transfer image-receiving sheet of the present disclosure will be described in detail below.

(Substrate)

Examples of the substrate include paper substrates and films.

Examples of paper substrates include condenser paper, glassine paper, parchment paper, synthetic paper, wood-free paper, art paper, coated paper, uncoated paper, cast-coated paper, wallpaper, cellulose fiber paper, synthetic resin internally added paper, lining paper, and impregnated paper. Examples of the impregnated paper include synthetic resin-impregnated paper, emulsion-impregnated paper, and synthetic rubber latex-impregnated paper.

Examples of the films include films made of resins (hereinafter, referred to simply as "resin films"). Examples of the resins include polyesters, such as PET, poly(butylene terephthalate) (PBT), and poly(ethylene naphthalate) (PEN); polyolefins, such as polyethylene (PE), polypropylene (PP), and polymethylpentene; vinyl resins, such as poly(vinyl chloride), poly(vinyl acetate), and vinyl chloride-vinyl acetate copolymers; (meth) acrylic resins, such as polyacrylate, polymethacrylate, and poly(methyl methacrylate); styrene resins, such as polystyrene (PS); polycarbonates; and ionomer resins.

When the substrate is a resin film, the resin film may be a stretched film or an unstretched film. From the viewpoint of mechanical strength, a uniaxially or biaxially stretched film is preferably used as the substrate.

In the present disclosure, the term "(meth) acrylic" includes both "acrylic" and "methacrylic". The term "(meth) acrylate" includes both "acrylate" and "methacrylate".

A laminate of the above-described paper substrate or resin film can also be used as the substrate. The laminate can be produced by, for example, a dry lamination method, a wet lamination method, or an extrusion method.

From the viewpoint of mechanical strength, the substrate preferably has a thickness of 20 μm or more and 500 μm or less, more preferably 50 μm or more and 500 μm or less, even more preferably 100 μm or more and 500 μm or less.

(Heat-Sensitive Recess-Forming Layer)

The thermal transfer image-receiving sheet of the present disclosure includes a heat-sensitive recess-forming layer having a thickness of 40 μm or more.

The thermal transfer image-receiving sheet according to an embodiment of the present disclosure is heated with, for example, a thermal head from the receiving layer side under high-temperature conditions to form a recess at the heat-sensitive recess-forming layer. This makes it possible to impart a high three-dimensional effect to a printed material to be produced.

Specifically, by forming a recess at the heat-sensitive recess-forming layer, that is, at the thermal transfer image-receiving sheet, the region of a relatively protruding portion is formed. For example, a recess can be formed in such a manner that the protruding portion represents a pattern or character, thereby improving the design of the printed material. As will be described below, the design can be further improved by forming an image, such as a hologram image, on the protruding portion.

Figure 4:
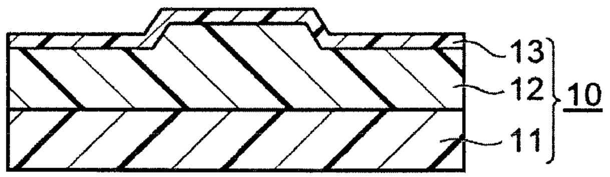
FIG. 4 is a schematic cross-sectional view illustrating an embodiment of a recess formed at the thermal transfer image-receiving sheet of the present disclosure illustrated in FIG. 1.
Figure 5:
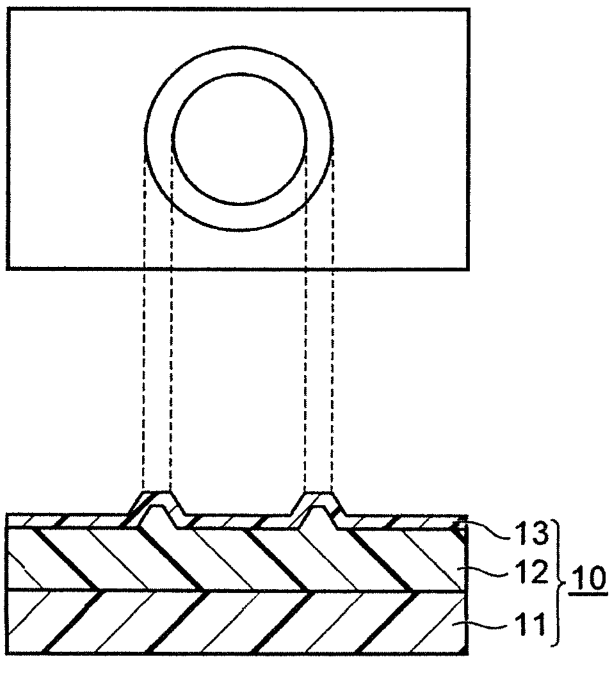
FIG. 5 is a schematic cross-sectional view illustrating an embodiment of recesses formed at the thermal transfer image-receiving sheet of the present disclosure illustrated in FIG. 1.

In the present disclosure, the recess is not limited to the one formed in the center of the thermal transfer image-receiving sheet illustrated in FIG. 3, and may be formed at end portions of the thermal transfer image-receiving sheet as illustrated in FIG. 4. The recesses may also be formed at one place or multiple places. As illustrated in FIG. 5, a protruding portion representing, for example, a pattern or character can be formed by forming recesses at multiple places.

An example of the structure of the heat-sensitive recess-forming layer will be described below. For example, for the first thermal transfer image-receiving sheet, the configuration of the heat-sensitive recess-forming layer is not particularly limited as long as the depth condition of the recess to be formed by heating of the thermal transfer image-receiving sheet through the PET film can be satisfied.

The heat-sensitive recess-forming layer of the first thermal transfer image-receiving sheet may have a single-layer structure or a multilayer structure. When the heat-sensitive recess-forming layer has a multilayer structure, the nth heat-sensitive recess-forming layer in order from the receiving layer side is referred to as an "nth heat-sensitive recess-forming layer", as described above, where n is an integer of 1 or more. The heat-sensitive recess-forming layer of the second thermal transfer image-receiving sheet has a multilayer structure. The number of layers of the multilayer structure is preferably 2 or more and 5 or less, more preferably 2 or more and 4 or less.

When the heat-sensitive recess-forming layer has a multilayer structure, the thermal transfer image-receiving sheet may include an adhesive layer between the layers in the heat-sensitive recess-forming layer.

The heat-sensitive recess-forming layer preferably has a thickness of 40 μm or more, more preferably 80 μm or more. This can improve the depth of a recess formed and the ease of forming the recess. Moreover, the image density of an image formed on the receiving layer can be improved. The heat-sensitive recess-forming layer preferably has a thickness of 200 μm or less from the viewpoint of transportability in a printer and processability.

In an embodiment, the heat-sensitive recess-forming layer of the first thermal transfer image-receiving sheet includes a pore-containing layer that includes at least one of a porous film having fine pores therein and a hollow particle-containing layer. The heat-sensitive recess-forming layer of the second thermal transfer image-receiving sheet includes two or more pore-containing layers.

The case where the heat-sensitive recess-forming layer is a pore-containing layer will be described below.

The heat-sensitive recess-forming layer may include both a porous film and a hollow particle-containing layer. The heat-sensitive recess-forming layer of the second thermal transfer image-receiving sheet preferably includes both the porous film and the hollow particle-containing layer. In this case, the first heat-sensitive recess-forming layer is the porous film. This can further improve the embossing-suppressing properties during printing.

When the heat-sensitive recess-forming layer is a pore-containing layer having a single-layer structure, the porosity is preferably 10% or more and 80% or less, more preferably 20% or more and 80% or more, even more preferably 30% or more and 60% or less. This can improve the depth of a recess formed and the ease of forming the recess. Moreover, the image density of an image formed on the receiving layer can be improved. Furthermore, the embossing-suppressing properties during printing can be improved.

When the heat-sensitive recess-forming layer is a pore-containing layer having a multilayer structure, the porosity of the first heat-sensitive recess-forming layer (heat-sensitive recess-forming layer disposed closest to the receiving layer) is preferably smaller than the porosity of the other heat-sensitive recess-forming layers. This can improve the embossing-suppressing properties during printing.

When the heat-sensitive recess-forming layer is a pore-containing layer having a multilayer structure, the porosity of the first heat-sensitive recess-forming layer is preferably 10% or more and 60% or less, more preferably 20% or more and 50% or less. This can improve the depth of a recess and the ease of forming the recess. Furthermore, the embossing-suppressing properties during printing can be improved.

When the heat-sensitive recess-forming layer is a pore-containing layer having a multilayer structure, the average porosity of heat-sensitive recess-forming layers other than the first heat-sensitive recess-forming layer is preferably 10% or more and 80% or less, more preferably 20% or more and 80% or less. This facilitates the formation of a recess at the first heat-sensitive recess-forming layer and can improve the embossing-suppressing properties during printing.

In the present disclosure, the porosity is calculated by (1−bulk specific gravity of heat-sensitive recess-forming layer/specific gravity of material of heat-sensitive recess-forming layer)×100.

When the specific gravity of the material of the heat-sensitive recess-forming layer is unknown, the porosity is calculated by a method described in Examples. Alternatively, the porosity is calculated as follows: A cross-sectional image of the heat-sensitive recess-forming layer is acquired with a scanning electron microscope (trade name: S3400N, available from Hitachi High Technologies Corporation). The porosity is calculated from ((b)/(a))×100, where (a) is the total area of the cross-sectional image, and (b) is the area occupied by pores (vacancies).

When the heat-sensitive recess-forming layer has a multilayer structure, the first heat-sensitive recess-forming layer preferably has a thickness of 20 μm or more and 150 μm or less, more preferably 30 μm or more and 130 μm or less, even more preferably 30 μm or more and 100 μm or less. This can improve the depth of a recess formed and the ease of forming the recess.

When the heat-sensitive recess-forming layer has a multilayer structure, the sum of the thicknesses of the layers other than the first heat-sensitive recess-forming layer is preferably 10 μm or more and 180 μm or less, more preferably 20 μm or more and 150 μm or less, even more preferably 20 μm or more and 130 μm or less. This can improve the image density of an image formed on the receiving layer.

In an embodiment, the heat-sensitive recess-forming layer includes a porous film as the first heat-sensitive recess-forming layer and a hollow particle-containing layer as the second heat-sensitive recess-forming layer.

In an embodiment, the first heat-sensitive recess-forming layer has a thickness of 25 μm or more, preferably 25 μm or more and 150 μm or less, more preferably 30 μm or more and 130 μm or less, even more preferably 30 μm or more and 100 μm or less. This can further improve the recess formability and the image quality.

In an embodiment, the second heat-sensitive recess-forming layer has a thickness of 35 μm or more, preferably 35 μm or more and 175 μm or less, more preferably 35 μm or more and 150 μm or less, even more preferably 35 μm or more and 130 μm or less.

In an embodiment, the ratio (porosity of porous film/porosity of hollow particle-containing layer) of the porosity of the porous film as the first heat-sensitive recess-forming layer to the porosity of the hollow particle-containing layer as the second heat-sensitive recess-forming layer is preferably 0.10 or more and 0.80 or less, more preferably 0.20 or more and 0.70 or less, even more preferably 0.30 or more and 0.60 or less, particularly preferably 0.30 or more and 0.50 or less. This can further improve the recess formability.

Examples of a resin material contained in the porous film include polyolefins, such as PE and PP; vinyl resins, such as poly(vinyl acetate), vinyl chloride-vinyl acetate copolymers, and ethylene-vinyl acetate copolymers; polyesters, such as PET and PBT; styrene resins; and polyamides. Among these, polyolefins are preferred, and PP is particularly preferred, from the viewpoints of film smoothness, thermal insulation properties, and cushioning properties. The porous film can contain one or two or more resin materials.

The porous film can contain an additive. Examples of the additive include plasticizers, fillers, ultraviolet stabilizers, anti-coloring agents, surfactants, fluorescent brightening agents, delusterants, deodorants, flame retardants, weathering agents, antistatic agents, yarn friction reducers, slip agents, antioxidants, ion exchangers, dispersants, ultraviolet absorbers, and coloring materials, such as pigments and dyes. The porous film may contain one or two or more additives.

The porous film can be produced by a known method. For example, the porous film can be produced by kneading organic or inorganic particles incompatible with the above-described resin material and forming the resulting mixture into a film. In an embodiment, the porous film can be produced by forming a mixture containing a first resin material and a second resin material having a higher melting point than the first resin material into a film.

The porous film is not limited to the porous film produced by the above method, and a commercially available porous film may also be used.

The porous film can be laminated on the substrate with the adhesive layer provided therebetween. Multiple porous films may be laminated with adhesive layers.

In an embodiment, the hollow particle-containing layer contains hollow particles and a binder material.

The hollow particles may be organic hollow particles, inorganic hollow particles, or organic-inorganic composite hollow particles. From the viewpoint of dispersibility, the organic hollow particles and the organic-inorganic composite hollow particles are preferred. The hollow particles may be foamed particles or non-foamed particles. The hollow particle-containing layer may contain one or two or more types of hollow particles.

The organic hollow particles are made of a resin material. Examples of the resin material include styrene resins, such as crosslinked styrene-acrylic resins, (meth) acrylic resins, phenolic resins, fluororesins, polyacrylonitriles, imide resins, and polycarbonates.

In an embodiment, the organic hollow particles can be produced by encapsulating a foaming material, such as butane gas, in resin particles and heating and foaming the particles. In an embodiment, the organic hollow particles can also be produced by emulsion polymerization. Commercially available organic hollow particles may also be used.

Examples of the organic-inorganic composite hollow particles include hollow particles in which surfaces of organic hollow particles are modified with an inorganic material. Examples of the organic hollow particles include the above-exemplified organic hollow particles. Examples of the inorganic material include talc, calcium carbonate, silica, and alumina. In an embodiment, the organic-inorganic composite hollow particles are hollow particles in which surfaces of polyacrylonitrile-based hollow particles are modified with talc. Commercially available organic-inorganic composite hollow particles may also be used.

The average particle size of the hollow particles is preferably 1 μm or more, more preferably 2 μm or more, and from the viewpoint of particularly superior recess formability, even more preferably 15 μm or more, still even more preferably 16 μm or more, particularly preferably 18 μm or more. The average particle size of the hollow particles is preferably 40 μm or less, more preferably 35 μm or less, in consideration of, for example, the thickness of the hollow particle-containing layer.

The average particle size of the hollow particles is measured by electron microscopy. Specifically, the cross-sectional image of a cross section of the hollow particle-containing layer is acquired by scanning electron microscopy. The particle size is defined as the average value of the long-axis length and the short-axis length of each particle in the cross-sectional image. The arithmetic mean of particle sizes of 100 particles is defined as the average particle size.

The true specific gravity of the hollow particles is preferably 0.01 or more and 0.50 or less, more preferably 0.05 or more and 0.40 or less, even more preferably 0.10 or more and 0.30 or less, from the viewpoint of uniform dispersibility in the layer. The true specific gravity of hollow particles can be measured by a gas displacement pycnometer method (constant volume expansion method).

The hollow particle-containing layer preferably has a hollow particle content of 20% by mass or more and 80% by mass or less, more preferably 30% by mass or more and 70% by mass or less, even more preferably 40% by mass or more and 70% by mass or less. This can improve the recess formability of the thermal transfer image-receiving sheet.

Examples of the binder material contained in the hollow particle-containing layer include polyurethanes, polyesters, urethane-modified polyesters, cellulose resins, vinyl resins, (meth) acrylic resins, polyolefins, styrene resins, gelatin and derivatives thereof, styrene-acrylate copolymers, poly(vinyl alcohol), poly(ethylene oxide), polyvinylpyrrolidone, pullulan, dextran, dextrin, poly(acrylic acid) and salts thereof, agar, κ-carrageenan, λ-carrageenan, ι-carrageenan, casein, xanthan gum, locust bean gum, alginic acid, and gum arabic. The hollow particle-containing layer may contain one or two or more binder materials.

The hollow particle-containing layer preferably has a binder material content of 20% by mass or more and 80% by mass or less, more preferably 30% by mass or more and 70% by mass or less, even more preferably 30% by mass or more and 60% by mass or less. This can improve the recess formability of the thermal transfer image-receiving sheet.

The hollow particle-containing layer can contain the above-described additive.

The hollow particle-containing layer can be formed by dispersing or dissolving the above materials in water or an appropriate organic solvent to prepare a coating liquid, applying the coating liquid to a substrate or the like by a known coating means to form a coating film, and drying the film. Examples of the coating means include a roll coating method, a reverse roll coating method, a gravure coating method, a reverse gravure coating method, a bar coating method, and a rod coating method.

In an embodiment, the heat-sensitive recess-forming layer includes a porous polyolefin film having a thickness of 25 μm or more as the first heat-sensitive recess-forming layer and a hollow particle-containing layer that contains hollow particles having an average particle size of 15 μm or more and that has a thickness of 35 μm or more as the second heat-sensitive recess-forming layer. The use of the heat-sensitive recess-forming layer according to the above embodiment provides the thermal transfer image-receiving sheet that has particularly superior recess formability and that can form an image having particularly satisfactory image quality.

(Receiving Layer)

The receiving layer is a layer that receives the sublimation dye transferred from a dye layer included in the thermal transfer sheet and that maintains the formed image.

In an embodiment, the receiving layer contains a resin material. The resin material is not limited as long as it is a resin that is easily dyed with a dye. Examples thereof include olefin resins, vinyl resins, (meth) acrylic resins, cellulose resins, ester resins, amide resins, carbonate resins, styrene resins, urethane resins, and ionomer resins. The receiving layer can contain one or two or more resin materials.

The receiving layer preferably has a resin material content of 80% by mass or more and 98% by mass or less, more preferably 90% by mass or more and 98% by mass or less.

In an embodiment, the receiving layer contains a release agent. This makes it possible to improve the releasability between the thermal transfer image-receiving sheet and the thermal transfer sheet.

Examples of the release agent include solid waxes, such as polyethylene wax, amide wax, and Teflon (registered trademark) powder, fluorinated or phosphate surfactants, silicone oils, various modified silicone oils, such as reactive silicone oils and curable silicone oils, and various silicone resins.

As the silicone oils, silicone oils in the form of oil can also be used. Modified silicone oils are preferred. As the modified silicone oils, amino-modified silicones, epoxy-modified silicones, aralkyl-modified silicones, epoxy-aralkyl-modified silicones, alcohol-modified silicones, vinyl-modified silicones, and urethane-modified silicones are preferred. Epoxy-modified silicones, aralkyl-modified silicones, and epoxy-aralkyl-modified silicones are particularly preferred.

The receiving layer can contain one or two or more release agents.

The receiving layer preferably has a release agent content of 0.5% by mass or more and 20% by mass or less, more preferably 0.5% by mass or more and 10% by mass or less. This can improve the releasability between the thermal transfer image-receiving sheet and the thermal transfer sheet while maintaining the transparency of the receiving layer.

The receiving layer can contain the above additive.

The receiving layer preferably has a thickness of 0.5 μm or more and 20 μm or less, more preferably 1 μm or more and 10 μm or less. This can improve the image density of an image formed on the receiving layer.

The receiving layer can be formed by dispersing or dissolving the above materials in water or an appropriate organic solvent to prepare a coating liquid, applying the coating liquid to the heat-sensitive recess-forming layer by a known coating means described above to form a coating film, and drying the film.

(Adhesive Layer)

The thermal transfer image-receiving sheet according to an embodiment of the present disclosure includes an adhesive layer between freely-selected layers. This can improve the adhesion between layers.

In an embodiment, the adhesive layer contains a resin material. Examples of the resin material include vinyl resins, such as poly(vinyl acetate), poly(vinyl butyral) (PVB), ethylene-vinyl acetate copolymers, and vinyl chloride-vinyl acetate copolymers; polyolefins, such as PE and PP; polyesters; (meth)acrylic resins, such as polyacrylates, polymethacrylates, and poly(methyl methacrylate); polyol resins; and polyurethanes. The adhesive layer can contain one or two or more resin materials.

The adhesive layer can contain the above additive.

The adhesive layer has a thickness of, for example, 0.5 μm or more and 10 μm or less.

The thickness of the adhesive layer formed between the layers of the heat-sensitive recess-forming layer having a multilayer structure is preferably 1 μm or more and 8 μm or less, more preferably 2 μm or more and 5 μm or less. This makes it possible to improve the adhesion between the layers while maintaining the recess formability in the heat-sensitive recess-forming layer.

The adhesive layer can be formed by dispersing or dissolving the above materials in water or an appropriate organic solvent to prepare a coating liquid, applying the coating liquid to a freely-selected layer by a known coating means described above to form a coating film, and drying the film. In an embodiment, the adhesive layer can be formed by melt extrusion of a resin composition containing the above materials.

(Primer Layer)

The thermal transfer image-receiving sheet according to an embodiment of the present disclosure includes a primer layer between the heat-sensitive recess-forming layer and the receiving layer. This can improve the adhesion between the layers.

In an embodiment, the primer layer contains a resin material. Examples of the resin material include polyesters, polyurethanes, polycarbonates, (meth)acrylic resins, styrene resins, vinyl resins, and cellulose resins. The primer layer can contain one or two or more resin materials.

The primer layer can contain the above-described additive.

The primer layer has a thickness of, for example, 0.1 μm or more and 3 μm or less.

The primer layer can be formed by dispersing or dissolving the above materials in water or an appropriate organic solvent to prepare a coating liquid, applying the coating liquid to the heat-sensitive recess-forming layer by a known coating means described above to form a coating film, and drying the film.

[Printed Material]

Figure 6:
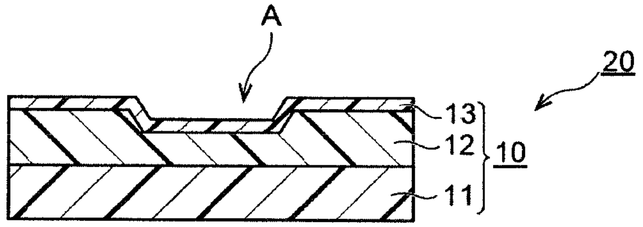
FIG. 6 is a schematic cross-sectional view illustrating a printed material according to an embodiment of the present disclosure.

A printed material 20 of the present disclosure is produced using the above thermal transfer image-receiving sheet, and, as illustrated in FIG. 6, is characterized by including the substrate 11, the heat-sensitive recess-forming layer 12, and the receiving layer 13 on which an image is formed, and a recess (A in the figure) having a depth of 5 μm or more is formed.

Figure 7:
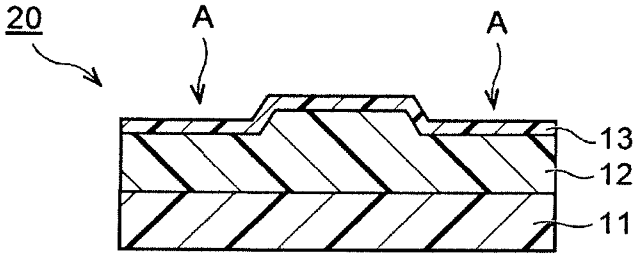
FIG. 7 is a schematic cross-sectional view illustrating a printed material according to an embodiment of the present disclosure.

In the present disclosure, the recess is not limited to the one formed in the center illustrated in FIG. 6. As illustrated in FIG. 7, the recess may be formed in an end portion. Additionally, one or more recesses may be formed in one or multiple places.

Figure 8:
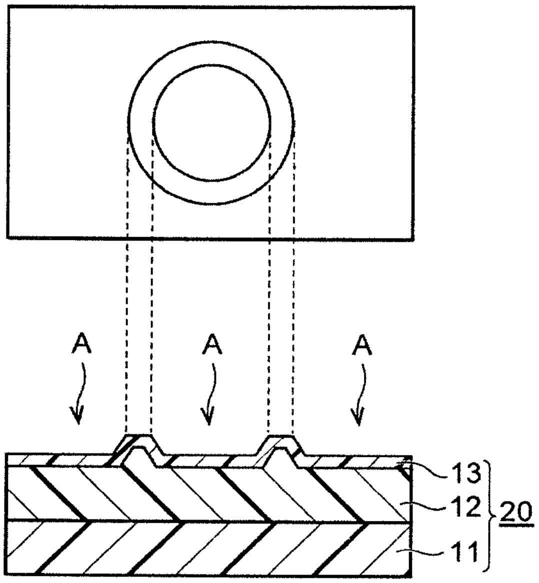
FIG. 8 is a schematic cross-sectional view illustrating a printed material according to an embodiment of the present disclosure.

As illustrated in FIG. 8, by forming recesses at multiple places of the thermal transfer image-receiving sheet, a protruding portion representing, for example, a pattern or character can be formed.

An image may be formed by transfer of a sublimation dye or transfer of a melt transfer-type coloring layer, may be formed by transfer of a hologram transfer layer, or may be formed by a combination thereof.

In an embodiment, the recess A is formed in a background image formation region formed by transferring a sublimation dye on the receiving layer, and the hologram image is formed in the relatively protruding region. The configuration can impart a three-dimensional effect to the hologram image formed in the relatively protruding region and can improve the design of the printed material. Moreover, a difference in brightness from the background image can be provided to further improve the three-dimensional effect.

The image formed on the receiving layer is not particularly limited to characters, patterns, symbols, combinations thereof, or the like. The image can be formed on the receiving layer by using, for example, a conventionally known thermal transfer sheet for use in a sublimation-type thermal transfer recording method or melt-type thermal transfer recording method.

(Protective Layer)

Figure 9:
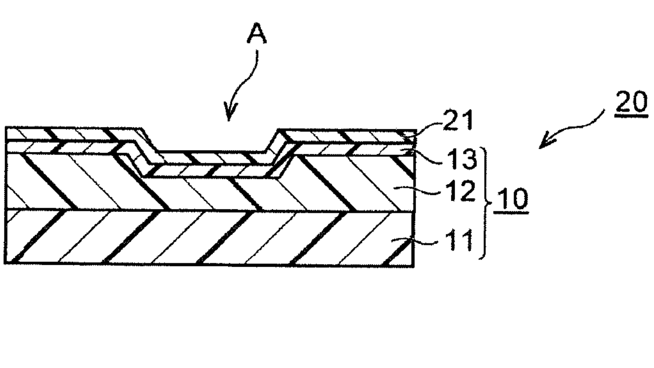
FIG. 9 is a schematic cross-sectional view illustrating a printed material according to an embodiment of the present disclosure.
Figure 10:
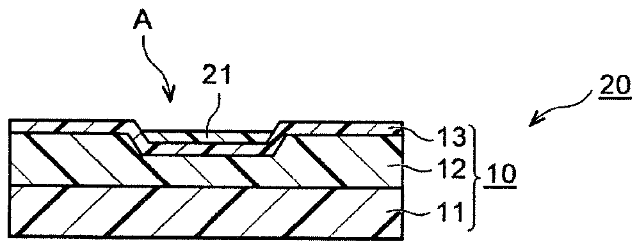
FIG. 10 is a schematic cross-sectional view illustrating a printed material according to an embodiment of the present disclosure.

A printed material 20 according to an embodiment of the present disclosure includes a protective layer 21 on the receiving layer 13, as illustrated in FIGS. 9 and 10.

In an embodiment, the protective layer 21 may be disposed over the entire surface of the receiving layer 13, and the recess A may be formed, as illustrated in FIG. 9.

In an embodiment, the protective layer 21 may be disposed so as to correspond to a region of the receiving layer 13 where the recess A is formed, as illustrated in FIG. 10. In this case, the thickness of the protective layer is not taken into consideration when the depth of the recess is measured.

In an embodiment, the protective layer contains a resin material. The resin material is not particularly limited as long as it is transparent. Examples of the resin material include (meth)acrylic resins, styrene resins, vinyl resins, polyolefins, polyesters, polyamides, imide resins, cellulose resins, thermosetting resins, and active ray-curable resins. The protective layer may contain one or two or more resin materials.

In the present disclosure, the term "active ray-cured resin" refers to a resin cured by irradiating the active ray-curable resin with active rays.

In the present disclosure, the term "active rays" refers to rays that chemically act on active ray-curable resins to promote polymerization, and specifically, refers to visible light, ultraviolet rays, X-rays, electron beams, α-rays, β-rays, γ-rays, or the like.

The protective layer preferably has a resin material content of 50% by mass or more and 95% by mass or less from the viewpoint of scratch resistance and storage stability of an image.

The protective layer can contain the above additive.

The protective layer preferably has a thickness of 0.1 μm or more and 10 μm or less, more preferably 0.5 μm or more and 5 μm or less. This can further improve the scratch resistance and storage stability of an image.

[Method for Producing Printed Material]

A method for producing a printed material according to the present disclosure includes:

- a step of providing the above-described thermal transfer image-receiving sheet;
- a step of forming an image on the receiving layer included in the thermal transfer image-receiving sheet; and
- a step of forming a recess at the thermal transfer image-receiving sheet.

The method for producing a printed material according to an embodiment of the present disclosure includes a step of forming a protective layer on the receiving layer on which an image is formed.

(Step of Providing Thermal Transfer Image-Receiving Sheet)

The method for producing a printed material of the present disclosure includes the step of providing the thermal transfer image-receiving sheet. Since the configuration and the production method of the thermal transfer image-receiving sheet have been described above, the description thereof is omitted here.

(Image Formation Step)

The method for producing a printed material of the present disclosure includes the step of forming an image on the receiving layer included in the thermal transfer image-receiving sheet.

Examples of a method for forming an image include a thermofusible transfer method in which a melt transfer-type coloring layer included in a thermal transfer sheet is transferred onto the receiving layer; and a sublimation transfer method in which a sublimation dye contained in a sublimation transfer-type coloring layer included in a thermal transfer sheet is transferred onto the receiving layer. These may also be combined to form an image.

An image formation region is not particularly limited. For example, an image with depth may be produced by forming an image in a region where the recess is formed. An image having a three-dimensional effect may also be produced by forming an image in a region where the recess is not formed.

For example, hologram transfer may also be performed in combination. For example, hologram transfer is performed on the region of the thermal transfer image-receiving sheet where the recess is not formed; thus, it is possible to form a hologram image having a higher three-dimensional effect to further improve the design of the resulting printed material.

When a thermal transfer sheet is used to form an image using a printer equipped with a thermal head, it is more preferable to apply an energy of 0.25 mJ/dot or less to the thermal head. This can further improve the embossing-suppressing properties during printing while maintaining image density.

(Recess Formation Step)

The method of producing a printed material of the present disclosure includes the step of forming a recess at the thermal transfer image-receiving sheet.

In an embodiment, the recess is formed on the thermal transfer image-receiving sheet before image formation.

In an embodiment, the recess is formed on the thermal transfer image-receiving sheet during image formation. As a specific example, a hologram image having a three-dimensional effect can be formed by transferring a sublimation dye from a thermal transfer sheet to form a background image, forming a recess in an image formation region, and performing hologram transfer from a thermal transfer sheet in a relatively protruding region where no recess is formed.

In an embodiment, the recess is formed at the thermal transfer image-receiving sheet after the formation of an image and before the formation of the protective layer.

In an embodiment, the recess is formed at the thermal transfer image-receiving sheet after the formation of the protective layer.

In an embodiment, the recess can be formed simultaneously with the formation of the protective layer. For example, in a region where the image has been formed, the protective layer is transferred under heating conditions such that the recess is not formed. In the other region, the protective layer is transferred under high-temperature conditions such that the recess is formed as described above. Thereby, a printed material in which a region other than the image formation region is recessed can be produced.

The method for forming a recess will be illustrated below, but the method is not limited thereto.

In an embodiment, the recess can be formed by heating the thermal transfer image-receiving sheet from the receiving layer side through a resin film, such as a PET film.

A back layer is preferably formed on a surface of the above-described resin film that is not in contact with the thermal transfer image-receiving sheet.

In an embodiment, the back layer contains a resin material. Examples of the resin material include cellulose resins, styrene resins, vinyl resins, polyesters, polyurethanes, polyamides, polycarbonates, polyimides, poly(amide-imide), chlorinated polyolefins, silicone-modified polyurethanes, fluorine-modified polyurethanes, and (meth)acrylic resins. The back layer can contain one or two or more resin materials.

In an embodiment, the back layer contains, as a resin material, a two-component curable resin that cures when used in combination with a curing agent, such as an isocyanate compound. Examples of the resin include poly(vinyl acetal) such as poly(vinyl acetoacetal) and poly(vinyl butyral).

In an embodiment, the back layer contains inorganic or organic particles.

The back layer preferably has a thickness of 0.1 μm or more and 5 μm or less, more preferably 0.5 μm or more and 2 μm or less. In this case, the occurrence of, for example, sticking and creasing can be suppressed while maintaining the transferability of thermal energy at the time of the formation of the recess.

The back layer can be formed by dispersing or dissolving the above materials in water or an appropriate organic solvent to prepare a coating liquid, applying the coating liquid to the resin film by a known coating means described above to form a coating film, and drying the film.

A release layer is preferably formed on a surface of the above resin film in contact with the thermal transfer image-receiving sheet. This can suppress fusion between the resin film and the thermal transfer image-receiving sheet in the recess formation step.

In an embodiment, the release layer contains a resin material. Examples of the resin material include (meth) acrylic resins, polyurethanes, acetal resins, polyamides, polyesters, melamine resins, polyol resins, cellulose resins, and silicone resins. The release layer may contain one or two or more resin materials.

In an embodiment, the release layer contains a release agent. Examples of the release agent include silicone oils, phosphate-based plasticizers, fluorine-containing compounds, waxes, metal soaps, and fillers. The release layer may contain one or two or more release agents.

The release layer has a thickness of, for example, 0.2 μm or more and 2.0 μm or less.

The release layer can be formed by dispersing or dissolving the above materials in water or an appropriate organic solvent to prepare a coating liquid, applying the coating liquid to the resin film by a known coating means described above to form a coating film, and drying the film.

In an embodiment, a recess can be formed by heating the thermal transfer image-receiving sheet from the receiving layer side through a thermal transfer sheet including a substrate and, for example, a sublimation transfer-type coloring layer, a hologram transfer layer, and a protective layer disposed on the substrate.

Specifically, the thermal transfer sheet is superimposed on the thermal transfer image-receiving sheet in such a manner that the sublimation transfer-type coloring layer, the hologram transfer layer, the protective layer, and the like included in the thermal transfer sheet face the receiving layer included in the thermal transfer image-receiving sheet. The thermal transfer sheet is heated from the substrate side. Thereby, the recess can be formed simultaneously with the transfer of the sublimation dye, the hologram transfer layer, the protective layer, and the like.

The heating for forming the recess may be performed in a region where the sublimation transfer-type coloring layer, the hologram transfer layer, or the protective layer of the thermal transfer sheet is disposed, or may be performed in a region (blank region) of the thermal transfer sheet where these layers are not disposed and where the substrate is exposed.

The above-mentioned release layer may be disposed on the thermal transfer sheet, and a recess may be formed by heating the region where the release layer is formed. The above-described back layer may be disposed on a surface of the substrate of the thermal transfer sheet opposite to the sublimation transfer-type coloring layer, the hologram transfer layer, the protective layer, and the like.

In an embodiment, yellow, magenta, and cyan sublimation transfer-type coloring layers, a protective layer, a blank region, and a hologram transfer layer are disposed as being frame sequentially on the same surface of the thermal transfer sheet.

In an embodiment, yellow, magenta, and cyan sublimation transfer-type coloring layers, a protective layer, a release layer, and a hologram transfer layer are disposed as being frame sequentially on the same surface of the thermal transfer sheet.

In an embodiment, a recess can be formed by directly heating the receiving layer included in the thermal transfer image-receiving sheet with, for example, a heating element, without the use of a resin film or thermal transfer sheet.

(Protective Layer Formation Step)

The method for producing a printed material according to an embodiment of the present disclosure includes a step of forming a protective layer on a receiving layer on which an image is formed. The protective layer can be formed by a conventionally known method, for example, by transferring a protective layer from a thermal transfer sheet. A film for forming a protective layer can also be laminated on the receiving layer with, for example, an adhesive layer.

The protective layer may be formed before or after the formation of a recess.

A region where the protective layer is formed is not particularly limited. The protective layer may be formed on the entire surface of the receiving layer or may be formed on a portion thereof.

For example, a recess may be formed in the image formation region, and a protective layer may be formed so as to correspond to the image formation region and the recess formation region. In this case, the depth of the recess is reduced, and the concave and convex impression of the printed material may be impaired. However, by adjusting the configuration of the protective layer to have a highly transparent configuration, the image formed in the recess formation region has a depth. As a result, a high three-dimensional effect can be imparted to the printed material.

The present disclosure relates to, for example, [1] to [12] below.

[1] A thermal transfer image-receiving sheet, including a substrate, a heat-sensitive recess-forming layer, and a receiving layer, in which the heat-sensitive recess-forming layer has a thickness of 40 μm or more, and a recess to be formed by application of an energy of 0.27 mJ/dot from the side of the receiving layer through a film including a 1-μm-thick back layer disposed on a poly(ethylene terephthalate) film having a thickness of 4 μm has a depth of 5 μm or more.

[2] The thermal transfer image-receiving sheet described in [1], in which the heat-sensitive recess-forming layer includes at least one of a porous film and a hollow particle-containing layer.

[3] The thermal transfer image-receiving sheet described in [1] or [2], in which the heat-sensitive recess-forming layer has a multilayer structure, and a first heat-sensitive recess-forming layer is included in the heat-sensitive recess-forming layer, is closest to the receiving layer, and has a porosity of 10% or more and 60% or less.

[4] The thermal transfer image-receiving sheet described in [3], in which the heat-sensitive recess-forming layer includes one or more heat-sensitive recess-forming layers other than the first heat-sensitive recess-forming layer, and the one or more heat-sensitive recess-forming layers have an average porosity of 10% or more and 80% or less.

[5] The thermal transfer image-receiving sheet described in [3] or [4], in which the first heat-sensitive recess-forming layer has a thickness of 20 μm or more and 150 μm or less.

[6] The thermal transfer image-receiving sheet described in any one of [3] to [5], in which the first heat-sensitive recess-forming layer is a porous film.

[7] A thermal transfer image-receiving sheet, including a substrate, a heat-sensitive recess-forming layer, and a receiving layer, in which the heat-sensitive recess-forming layer has a thickness of 40 μm or more, the heat-sensitive recess-forming layer includes two or more pore-containing layers, and a first heat-sensitive recess-forming layer is included in the heat-sensitive recess-forming layer, is closest to the receiving layer, and is a porous film.

[8] The thermal transfer image-receiving sheet described in [7], in which the heat-sensitive recess-forming layer includes the porous film as the first heat-sensitive recess-forming layer and a hollow particle-containing layer as a second heat-sensitive recess-forming layer.

[9] The thermal transfer image-receiving sheet described in [8], in which the first heat-sensitive recess-forming layer is a porous polyolefin film having a thickness of 25 μm or more, and the second heat-sensitive recess-forming layer contains hollow particles having an average particle size of 15 μm or more and has a thickness of 35 μm or more.

[10] A method for producing a printed material, including a step of providing the thermal transfer image-receiving sheet described in any one of [1] to [9], a step of forming an image on the receiving layer included in the thermal transfer image-receiving sheet, and a step of forming a recess at the thermal transfer image-receiving sheet.

[11] A printed material produced by using the thermal transfer image-receiving sheet described in any one of [1] to [9], the printed material including the substrate, the heat-sensitive recess-forming layer, and the receiving layer on which an image is formed, in which a recess having a depth of 5 μm or more is formed.

[12] The printed material described in [11], in which the recess is formed in an image formation region on the receiving layer.

EXAMPLES

While a thermal transfer image-receiving sheet and so forth of the present disclosure will be described in more detail below with reference to examples, the thermal transfer image-receiving sheet and so forth of the present disclosure are not limited to these examples.

Example 1

Double-sided coated paper having a thickness of 200 μm was provided as a substrate. A coating liquid, having the following composition, for forming an adhesive layer was applied to one surface of the substrate and dried to form an adhesive layer having a thickness of 3 μm. A 35-μm-thick porous PP film A (porosity: 22%, density: 0.7 g/cm$^3$) was laminated on the adhesive layer. The coating liquid, having the following composition, for forming an adhesive layer was applied to the porous PP film A and dried to form an adhesive layer having a thickness of 3 μm. The porous PP film A was further laminated on the adhesive layer. Thereby, a heat-sensitive recess-forming layer including the two porous PP films A was formed on the substrate.

<Coating Liquid for Forming Adhesive Layer>

| | |
|---|---|
| Acrylic resin (Polystic EM-560, available from Arakawa Toryo Kogyo Co., Ltd.) | 100 parts by mass |
| Curing agent (Polystic curing agent EM-545K, available from Arakawa Toryo Kogyo Co., Ltd.) | 10 parts by mass |

A coating liquid, having the following composition, for forming a primer layer was applied to the heat-sensitive recess-forming layer formed as described above and dried to form a primer layer having a thickness of 1.5 μm.

<Coating Liquid for Forming Primer Layer>

| | |
|---|---|
| Polyester (Polyester (registered trademark) WR-905, available from The Nippon Synthetic Chemical Industry Co., Ltd.) | 4.2 parts by mass |
| Titanium oxide (TCA-888, available from Sakai Chemical Industry Co., Ltd.) | 8.4 parts by mass |

-continued

| | |
|---|---|
| Isopropyl alcohol (IPA) | 10 parts by mass |
| Water | 30 parts by mass |

A coating liquid, having the following composition, for forming a receiving layer was applied to the primer layer formed as described above and dried to form a receiving layer having a thickness of 4 μm. In this way, a thermal transfer image-receiving sheet was produced.

<Coating Liquid for Forming Receiving Layer>

| | |
|---|---|
| Vinyl chloride-vinyl acetate copolymer (Solbin (registered trademark) C, available from Nissin Chemical Industry Co., Ltd.) | 60 parts by mass |
| Epoxy-modified silicone resin (X-22-3000T, available from Shin-Etsu Chemical Co., Ltd.) | 1.2 parts by mass |
| Methylstyryl-modified silicone resin (X-24-510, available from Shin-Etsu Chemical Co., Ltd.) | 0.6 parts by mass |
| Methyl ethyl ketone | 2.5 parts by mass |
| Toluene | 2.5 parts by mass |

Example 2

A thermal transfer image-receiving sheet was produced as in Example 1, except that the heat-sensitive recess-forming layer was formed as described below.

A coating liquid A, having the following composition, for forming a hollow particle-containing layer was applied to one surface of a 40-μm-thick porous PP film B (porosity: 31%, density: 0.62 g/cm$^3$) and dried to form a hollow particle-containing layer A (porosity: 55%) having a thickness of 20 μm. The coating liquid, having the above-described composition, for forming an adhesive layer was applied to one surface of a substrate (double-sided coated paper having a thickness of 200 μm) and dried to form an adhesive layer having a thickness of 3 μm. Then, the hollow particle-containing layer A formed on the porous PP film B and the adhesive layer were bonded to each other in such a manner that the hollow particle-containing layer A faced the adhesive layer, thereby forming a heat-sensitive recess-forming layer including the hollow particle-containing layer A and the porous PP film B on the substrate.

<Coating Liquid A for Forming Hollow Particle-Containing Layer>

| | |
|---|---|
| Hollow particle dispersion (average particle size: 3.2 μm) (active ingredient: 35%, available from Matsumoto Yushi-Seiyaku Co., Ltd.) | 120 parts by mass |
| Modified styrene-acrylic acid copolymer (NIPOL SX1707A, available from Zeon Corporation, active ingredient: 45%) | 140 parts by mass |
| IPA | 70 parts by mass |
| Water | 160 parts by mass |

Example 3

A thermal transfer image-receiving sheet was produced as in Example 1, except that the heat-sensitive recess-forming layer was formed as described below.

The coating liquid, having the above-described composition, for forming an adhesive layer was applied to one surface of a substrate (double-sided coated paper having a thickness of 200 μm) and dried to form an adhesive layer having a thickness of 3 μm. A 35-μm-thick porous PP film A was laminated on the adhesive layer. The coating liquid A, having the above-described composition, for forming a hollow particle-containing layer was applied to the porous PP film A and dried to form a hollow particle-containing layer A (porosity: 55%) having a thickness of 20 μm. In this way, a heat-sensitive recess-forming layer including the porous PP film A and the hollow particle-containing layer A was formed on the substrate.

Example 4

A thermal transfer image-receiving sheet was produced as in Example 1, except that the heat-sensitive recess-forming layer was formed as described below.

The coating liquid A, having the above-described composition, for forming a hollow particle-containing layer was applied to one surface of a substrate (double-sided coated paper having a thickness of 200 μm) and dried to form a hollow particle-containing layer A (porosity: 55%) having a thickness of 20 μm. The coating liquid A, having the above-described composition, for forming a hollow particle-containing layer was applied to the hollow particle-containing layer A and dried to form a hollow particle-containing layer A (porosity: 55%) having a thickness of 20 μm. In this way, a heat-sensitive recess-forming layer including the two hollow particle-containing layers was formed on the substrate.

Example 5

A thermal transfer image-receiving sheet was produced as in Example 1, except that the heat-sensitive recess-forming layer was formed as described below.

The coating liquid, having the above-described composition, for forming an adhesive layer was applied to one surface of a substrate (double-sided coated paper having a thickness of 200 μm) and dried to form an adhesive layer having a thickness of 3 μm. A 90-μm-thick porous PP film C (porosity: 12%, density: 0.79 g/cm$^3$) was laminated on the adhesive layer. The coating liquid, having the above-described composition, for forming an adhesive layer was applied to the porous PP film C and dried to form an adhesive layer having a thickness of 3 μm. A porous PP film A having a thickness of 35 μm was laminated on the adhesive layer. In this way, a heat-sensitive recess-forming layer including the porous PP film C and the porous PP film A was formed on the substrate.

Example 6

A thermal transfer image-receiving sheet was produced as in Example 1, except that the heat-sensitive recess-forming layer was formed as described below.

The coating liquid, having the above-described composition, for forming an adhesive layer was applied to one surface of a substrate (double-sided coated paper having a thickness of 200 μm) and dried to form an adhesive layer having a thickness of 3 μm. A 90 μm-thick porous PP film C (porosity: 12%, density: 0.79 g/cm$^3$) was laminated on the adhesive layer to provide a heat-sensitive recess-forming layer.

Example 7

A thermal transfer image-receiving sheet was produced as in Example 1, except that the heat-sensitive recess-forming layer was formed as described below.

A coating liquid B, having the following composition, for forming a hollow particle-containing layer was applied to one surface of a porous PP film A (porosity: 22%, density: 0.7 g/cm$^3$) having a thickness of 35 μm and dried to form a hollow particle-containing layer B (porosity: 66%) having a thickness of 50 μm. The coating liquid, having the above-described composition, for forming an adhesive layer was applied to one surface of the substrate (double-sided coated paper having a thickness of 200 μm) and dried to form an adhesive layer having a thickness of 3 μm. Then, the hollow particle-containing layer B formed on the porous PP film A and the adhesive layer were bonded to each other in such a manner that the hollow particle-containing layer B faced the adhesive layer to form a heat-sensitive recess-forming layer including the hollow particle-containing layer B and the porous PP film A on the substrate.

<Coating Liquid B for Forming Hollow Particle-Containing Layer>

| | |
|---|---|
| Polyacrylonitrile-based hollow particles (talc-treated product) (MFL-81GTA, available from Matsumoto Yushi-Seiyaku Co., Ltd., average particle size: 20 μm, true specific gravity: 0.23) | 18 parts by mass |
| Urethane resin (Nipporan (registered trademark) 5120, available from Tosoh Corporation, active ingredient: 30%) | 40 parts by mass |
| Ethyl acetate | 71 parts by mass |
| IPA | 71 parts by mass |

Example 8

A thermal transfer image-receiving sheet was produced as in Example 7, except that the thickness of the hollow particle-containing layer B was changed to 35 μm, and the 35-μm-thick porous PP film A was replaced with a 40 μm-thick porous PP film B (porosity: 31%, density: 0.62 g/cm$^3$).

Example 9

A thermal transfer image-receiving sheet was produced as in Example 1, except that the heat-sensitive recess-forming layer was formed as described below.

The coating liquid A, having the above-described composition, for forming a hollow particle-containing layer was applied to one surface of a 40-μm-thick porous PP film B (porosity: 31%, density: 0.62 g/cm$^3$) and dried to form a 35-μm-thick hollow particle-containing layer A (porosity: 55%). The coating liquid, having the above-described composition, for forming an adhesive layer was applied to one surface of a substrate (double-sided coated paper having a thickness of 200 μm) and dried to form an adhesive layer having a thickness of 3 μm. Then, the hollow particle-containing layer A formed on the porous PP film B and the adhesive layer were bonded to each other in such a manner that the hollow particle-containing layer A faced the adhesive layer to form a heat-sensitive recess-forming layer including the hollow particle-containing layer A and the porous PP film B on the substrate.

Comparative Example 1

A thermal transfer image-receiving sheet was produced as in Example 1, except that the coating liquid, having the above-described composition, for forming an adhesive layer was applied to one surface of a substrate (double-sided coated paper having a thickness of 200 μm) and dried to form an adhesive layer having a thickness of 3 μm, and a porous PP film A having a thickness of 35 μm was laminated on the adhesive layer to form a heat-sensitive recess-forming layer.

<<Evaluation of Recess Formability>>

A coating solution, having the following composition, for forming a back layer was applied to one surface of a 4-μm-thick PET film (Lumirror (registered trademark) #5A-F53 available from Toray Industries, Inc.), dried, and aged at 60° C. for 100 hours to form a back layer having a thickness of 1 μm.

A region of the receiving layer included in the thermal transfer image-receiving sheet produced in each of the examples and comparative examples described above was heated by application of an energy of 0.27 mJ/dot with the following test printer from the receiving layer side through the above-described PET film including the back layer, thereby forming a recess. Here, the above-described PET film including the back layer was arranged in such a manner that the PET film and the receiving layer were in contact with each other.

<Coating Liquid for Forming Back Layer>

| | |
|---|---|
| Poly(vinyl butyral) resin (S-LEC (registered trademark) BX-1, available from Sekisui Chemical Co., Ltd.) | 1.8 parts by mass |
| Polyisocyanate (Burnock (registered trademark) D750, available from DIC Corporation) | 5.5 parts by mass |
| Phosphate-based surfactant (Plysurf (registered trademark) A208N, available from Dai-ichi Kogyo Seiyaku Co., Ltd.) | 1.6 parts by mass |
| Talc (Micro Ace (registered trademark) P-3, available from Nippon Talc Co., Ltd.) | 0.35 parts by mass |
| Toluene | 18.5 parts by mass |
| Methyl ethyl ketone | 18.5 parts by mass |

(Test Printer)

Thermal head: F3589 (available from Toshiba Hokuto Electronics Corporation)

Thermal head linear pressure: 292 N/m

Average resistance of heating element: 5,015 Ω

Printing voltage: 20 V

Resolution in main scanning direction: 300 dpi (dot per inch)

Resolution in sub-scanning direction: 300 dpi

Line speed: 4.0 msec/line

Printing start temperature: 35° C.

Pulse duty ratio: 85%

Gradation value: 255/255 (maximum gradation)

The depth of the formed recess was measured from a profile obtained using a shape analysis laser microscope (Keyence Corporation VK-X150/160, objective lens: 10×) and evaluated according to evaluation criteria described below. Table 1 presents the evaluation results.

(Evaluation Criteria)

S: The recess depth was 15 μm or more, and a very good recess was formed.

A: The recess depth was 10 μm or more and less than 15 μm, and a good recess was formed.

B: The recess depth was 5 μm or more and less than 10 μm, and a recess was formed.

NG: The recess depth was less than 5 μm.

<<Evaluation of Embossing-Suppressing Properties During Printing>>

Provided were the thermal transfer image-receiving sheet obtained in the examples and comparative examples described above, a sublimation-type thermal transfer printer (DS620, available from Dai Nippon Printing Co., Ltd.) equipped with a thermal head, and a genuine ribbon for the printer, the ribbon including a dye layer containing a sublimation dye and a protective layer.

In an environment of 20° C. and 50% RH, a portrait N1 image specified by JIS X 9201 (high-definition color digital standard image) was formed by printing on the receiving layer included in each of the thermal transfer image-receiving sheets. Then the protective layer was transferred from the genuine ribbon onto the receiving layer on which the image was formed, thereby producing a printed material. The resulting printed material was visually checked and evaluated in accordance with the following evaluation criteria. Table 1 presents the evaluation results.

(Evaluation Criteria)

A: No noticeable steps are formed by heat applied during image formation, and the good design is maintained.

B: There is room for improvement in design because noticeable steps are formed by heat applied during image formation.

TABLE 1

| | | First heat-sensitive recess-forming layer | | | | Second heat-sensitive recess-forming layer | | | | Evaluation results | |
|---|---|---|---|---|---|---|---|---|---|---|---|
| | Thickness of heat-sensitive recess-forming layer (μm) | | Average particle size of hollow particles (μm) | Porosity (%) | Thickness (μm) | | Average particle size of hollow particles (μm) | Porosity (%) | Thickness (μm) | Recess formability | Embossing-suppressing properties during printing |
| Example 1 | 70 | Porous PP film A | | 22 | 35 | Porous PP film A | | 22 | 35 | A | A |
| Example 2 | 60 | Porous PP film B | | 31 | 40 | Hollow particle-containing layer A | 3.2 | 55 | 20 | A | A |
| Example 3 | 55 | Hollow particle-containing layer A | 3.2 | 55 | 20 | Porous PP film A | | 22 | 35 | A | B |
| Example 4 | 40 | Hollow particle-containing layer A | 3.2 | 55 | 20 | Hollow particle-containing layer A | 3.2 | 55 | 20 | A | B |
| Example 5 | 125 | Porous PP film A | | 22 | 35 | Porous PP film C | | 12 | 90 | A | A |
| Example 6 | 90 | Porous PP film C | | 12 | 90 | — | | — | — | B | A |

TABLE 1-continued

| | Thickness of heat-sensitive recess-forming layer (μm) | First heat-sensitive recess-forming layer | | | | Second heat-sensitive recess-forming layer | | | | Evaluation results | |
|---|---|---|---|---|---|---|---|---|---|---|---|
| | | | Average particle size of hollow particles (μm) | Porosity (%) | Thickness (μm) | | Average particle size of hollow particles (μm) | Porosity (%) | Thickness (μm) | Recess formability | Embossing-suppressing properties during printing |
| Example 7 | 85 | Porous PP film A | | 22 | 35 | Hollow particle-containing layer B | 20 | 66 | 50 | S | A |
| Example 8 | 75 | Porous PP film B | | 31 | 40 | Hollow particle-containing layer B | 20 | 66 | 35 | S | A |
| Example 9 | 75 | Porous PP film B | | 31 | 40 | Hollow particle-containing layer A | 3.2 | 55 | 35 | A | A |
| Comparative example 1 | 35 | Porous PP film A | | 22 | 35 | — | | — | — | NG | A |

The porosity of the above-described porous PP film was calculated from the formula (1−bulk specific gravity of heat-sensitive recess-forming layer/specific gravity of materials constituting heat-sensitive recess-forming layer)×100. The porosity of the above-described hollow particle-containing layer was calculated from the formula $\{1-(t2/t1)\}\times 100$, where t1 is the thickness of the hollow particle-containing layer before heating and pressurizing the hollow particle-containing layer formed on the substrate with a heat sealer at 150° C. for 10 seconds at a pressure of 0.49 MPa, and t2 is the thickness after the heating and pressurizing.

As will be appreciated by those skilled in the art, the thermal transfer image-receiving sheet of the present disclosure is not limited by the description of the above examples. The above examples and specification are merely for explaining the principle of the present disclosure. Various modifications and improvements can be made without departing from the spirit and scope of the present disclosure. All such modifications and improvements are included in the scope of the present disclosure as claimed. Furthermore, the scope of protection as claimed in the present disclosure includes not only the scope of the claims but also equivalents thereof.

REFERENCE SIGNS LIST

10 thermal transfer image-receiving sheet
11 substrate
12 heat-sensitive recess-forming layer
13 receiving layer
14 first heat-sensitive recess-forming layer
15 second heat-sensitive recess-forming layer
20 printed material
21 protective layer

The invention claimed is:

1. A thermal transfer image-receiving sheet, comprising:

a substrate, a heat-sensitive recess-forming layer, and a receiving layer, wherein the heat-sensitive recess-forming layer has a thickness of 40 μm or more, and a recess to be formed by application of an energy of 0.27 mJ/dot from a side of the receiving layer through a film including a 1-μm-thick back layer disposed on a poly (ethylene terephthalate) film having a thickness of 4 μm has a depth of 5 μm or more.

2. The thermal transfer image-receiving sheet according to claim 1, wherein the heat-sensitive recess-forming layer includes at least one of a porous film and a hollow particle-containing layer.

3. The thermal transfer image-receiving sheet according to claim 1, wherein the heat-sensitive recess-forming layer has a multilayer structure, and a first heat-sensitive recess-forming layer is included in the heat-sensitive recess-forming layer, is closest to the receiving layer, and has a porosity of 10% or more and 60% or less.

4. The thermal transfer image-receiving sheet according to claim 3, wherein the heat-sensitive recess-forming layer includes one or more heat-sensitive recess-forming layers other than the first heat-sensitive recess-forming layer, and the one or more heat-sensitive recess-forming layers have an average porosity of 10% or more and 80% or less.

5. The thermal transfer image-receiving sheet according to claim 3, wherein the first heat-sensitive recess-forming layer has a thickness of 20 μm or more and 150 μm or less.

6. The thermal transfer image-receiving sheet according to claim 3, wherein the first heat-sensitive recess-forming layer is a porous film.

7. A method for producing a printed material, comprising:

a step of providing the thermal transfer image-receiving sheet according to claim 1;

a step of forming an image on the receiving layer included in the thermal transfer image-receiving sheet; and a step of forming a recess at the thermal transfer image-receiving sheet.

8. A printed material produced by using the thermal transfer image-receiving sheet according to claim 1, the printed material comprising:

the substrate, the heat-sensitive recess-forming layer, and the receiving layer on which an image is formed, wherein a recess having a depth of 5 μm or more is formed.

9. The printed material according to claim 8, wherein the recess is formed in an image formation region on the receiving layer.

10. A thermal transfer image-receiving sheet, comprising:

a substrate, a heat-sensitive recess-forming layer, and a receiving layer, wherein the heat-sensitive recess-forming layer has a thickness of 40 μm or more, wherein the heat-sensitive recess-forming layer includes a porous film as a first heat-sensitive recess-forming layer, and a hollow particle-containing layer as a second heat-sensitive recess-forming layer, and wherein the first heat-sensitive recess-forming layer is a porous polyolefin film having a thickness of 25 μm or more, and the second heat-sensitive recess-forming layer contains hollow particles having an average particle size of 15 μm or more and has a thickness of 35 μm or more.

* * * * *